Aug. 2, 1960 W. A. RAY 2,947,510
SOLENOID OPERATED GAS VALVE WITH SOLENOID RETARDING MEANS
Filed Sept. 9, 1957 3 Sheets-Sheet 1

INVENTOR,
WILLIAM A. RAY
BY
John H. Rouse,
ATTORNEY.

Aug. 2, 1960 W. A. RAY 2,947,510
SOLENOID OPERATED GAS VALVE WITH SOLENOID RETARDING MEANS
Filed Sept. 9, 1957 3 Sheets-Sheet 2
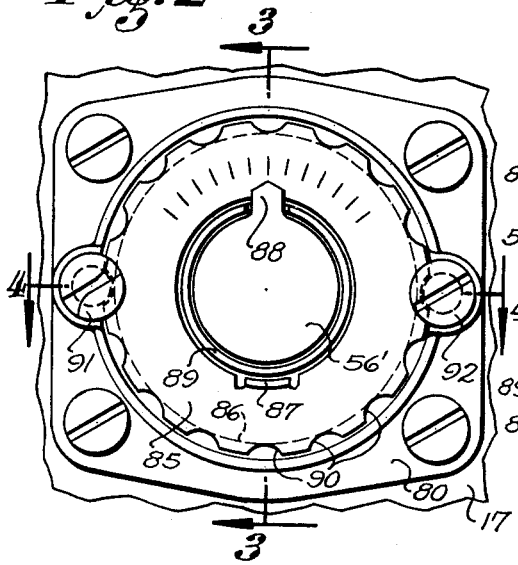
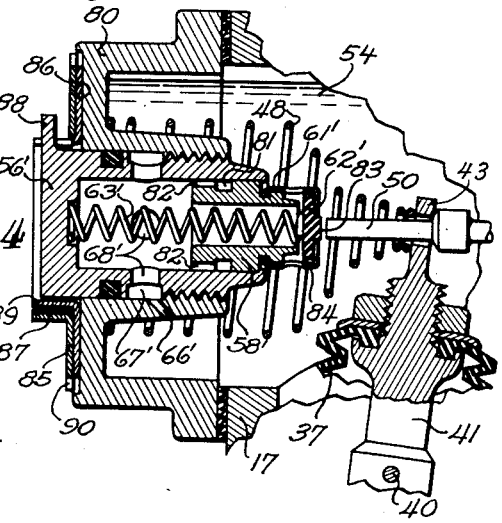
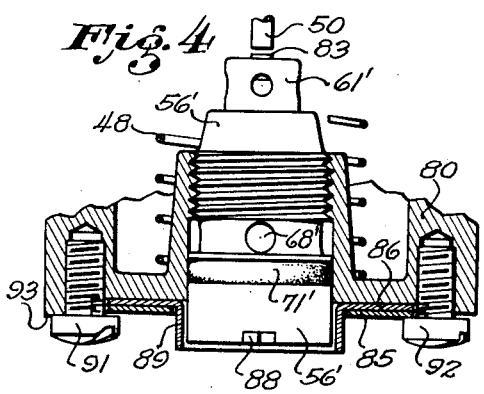
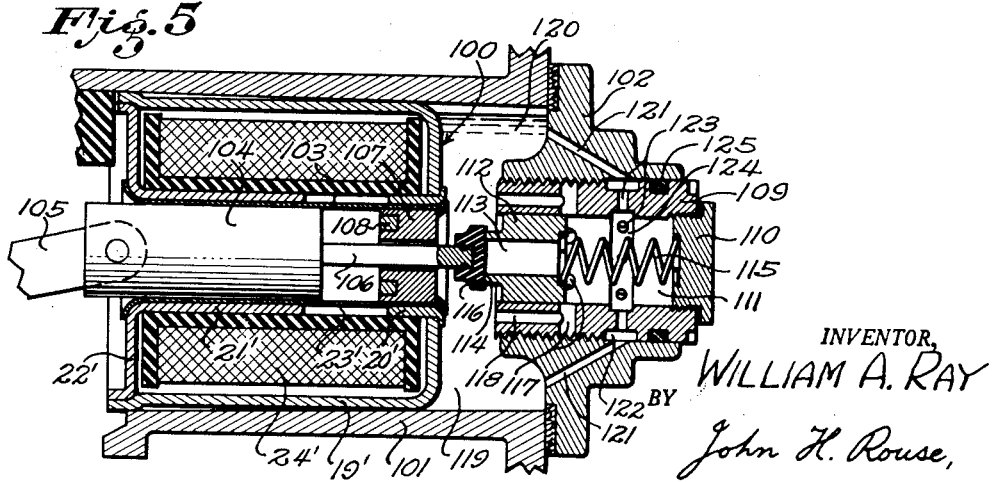
INVENTOR,
WILLIAM A. RAY
BY John H. Rouse,
ATTORNEY.

Aug. 2, 1960 W. A. RAY 2,947,510
SOLENOID OPERATED GAS VALVE WITH SOLENOID RETARDING MEANS
Filed Sept. 9, 1957 3 Sheets-Sheet 3
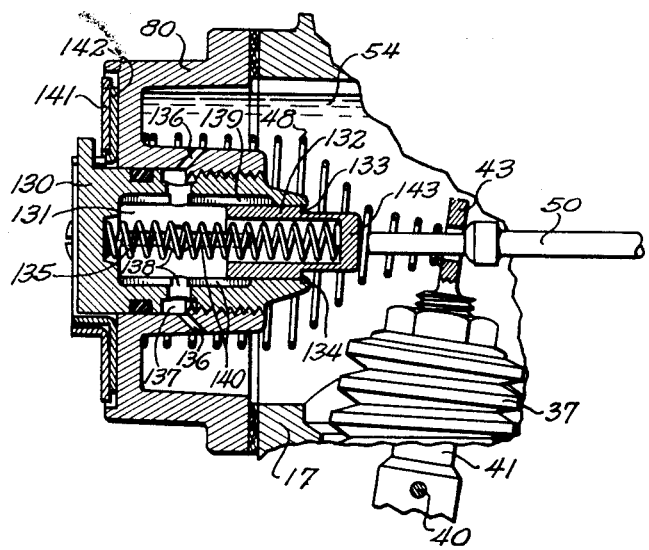
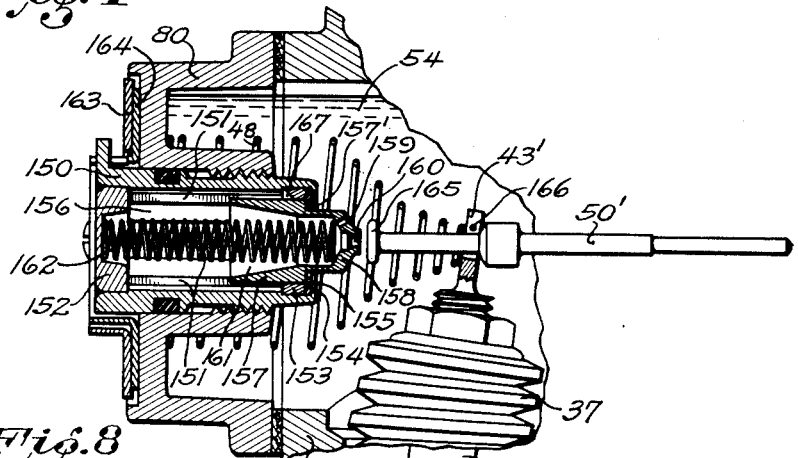
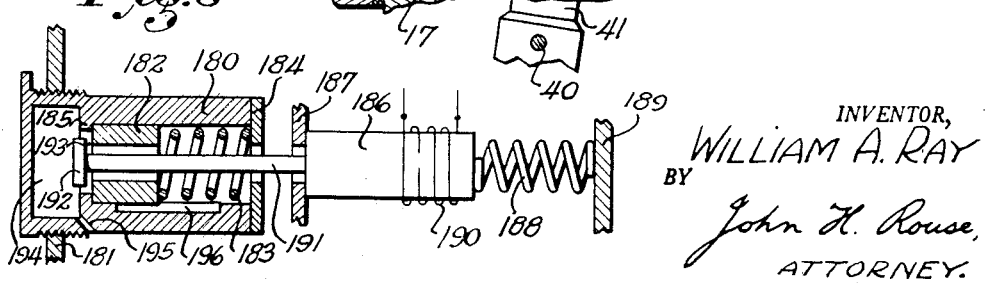
INVENTOR,
WILLIAM A. RAY
BY
John H. Rouse,
ATTORNEY.

United States Patent Office 2,947,510
Patented Aug. 2, 1960

2,947,510

SOLENOID OPERATED GAS VALVE WITH SOLENOID RETARDING MEANS

William A. Ray, North Hollywood, Calif., assignor to General Controls Co., Glendale, Calif., a corporation of California Filed Sept. 9, 1957, Ser. No. 682,711

15 Claims. (Cl. 251—54)

This invention relates to electromagnetically operated valves, and more particularly to solenoid valves for controlling the supply of fuel to gas-burning heating apparatus.

The various arrangements described herein have for their primary purposes the control of supply of gas to a burner so as to achieve efficient combustion and safe operating conditions, and without the likelihood of so-called "rollback" and/or "backfiring."

The term "rollback," as understood by those skilled in the art, has reference to the development in the combustion chamber of more than the required amount of fuel to initiate combustion. Rollback manifests itself in the nature of a minor explosion which, while seldom dangerous, is alarming, and may cause extinguishment of the pilot burner or burners. Thus, for example, rollback may result if the valve is opened too suddenly (as by an ordinary solenoid operator) so that the initial supply of gas to the burner is at full rate. To avoid the possibility of such rollback, it is desirable to retard full-opening of the gas supply valve. However, initial supply of gas at a rate sufficient to establish a satisfactory low-fire condition should not be too slow, otherwise there may be backfiring of the gas inside the burner. I have found that, in most cases, the possibility of rollback of the fire is precluded if the gas supply valve is opened slowly to a medium-fire position, and thereafter further opening of the valve is at a higher rate. However, in other cases, it may be desirable that the rate of opening of the valve be increased relatively gradually after the valve reaches its medium-fire position.

The term "backfiring" has reference to burning of the gas inside the burner or burner venturi where, of course, it is very undesirable and productive of undesirable conditions. For example, if the gas starts to burn off the inspirating jets and combustion takes place inside the burner venturi or the burner itself, cracking of the gas occurs, and the burner may be then filled with carbon and thus result in a fire hazard, and/or requirement for replacement of the burner as there is no practical way of removing the carbon.

Such rollback and backfiring depend upon many different conditions such as, for example, the type of gas, the B.t.u. content of the gas, the size of the heating unit in relationship to the capacity of the valve, gas pressure and the like; and thus in general are rather unpredictable.

It is, of course, desirable to provide a gas control which minimizes the likelihood of rollback and backfiring and, particularly, to allow adjustment of such control to meet various situations as they may exist. For these purposes, each of the various arrangements, described herein, incorporates a means for retarding the movement of the closure means of a solenoid operated gas valve, and such retarding means is adjustable, in the sense that the valve closure means may be retarded throughout the full stroke of the solenoid or such retarding means may be rendered effective only after the closure means is moved to a partially-open condition for achieving a low-fire condition rapidly.

An important feature of the present invention is the provision of adjustable means for determining the point in the range of opening movement of the valve at which the retarding means becomes effective, to establish a predetermined low-fire condition of the burner. A predetermined low-fire condition is desirable when ordinary manufactured gas is used, but where the B.t.u. content of the gas is higher, such as with natural gas, propane, L.P.G. (liquified petroleum gases) or butane, the control is desirably adjusted so that the valve is opened rapidly to a smaller degree before the retarding means becomes effective. Indeed, when the B.t.u. content is relatively high, it may be desirable to adjust the retarding means so that it is always effective even in the initial opening of the valve. If the retarding means could not be adjusted so as to provide a delayed action of the retarding means, there is a probability that backfiring may result with some types of gases.

Such retarding means is uniquely associated with the solenoid means in such a manner that the valve closure means is retarded in its movement from its normally-closed position towards its fully-open position without, however, impeding return movement of the closure means to its closed position after the solenoid means is de-energized, so that the flow of gas is shut off rapidly to prevent the likelihood of backfiring. The retarding means in such case is restored to its normal condition, by independent means, in a short time commensurate with the time required for the closure means to move to closed position, so that, should the solenoind means be energized again in a short time thereafter, the retarding means is fully effective to perform its function of then retarding the valve closure means.

For these purposes, the solenoid means is restored to its normal condition by positive power acting means as, for example, by a biasing spring; and, likewise, the retarding means is restored to its normal condition by independent power operated means as, for example, by a spring.

Such retarding means, as shown herein, comprises a liquid filled mechanism which may be referred to as a dashpot. Such liquid, besides being used to provide a controlled retarding effect, is also used for quelling hum of the solenoid means when it is energized with alternating current. For such purposes, the liquid is contained in a common casing which houses the solenoid means and the dashpot, so that a portion of the liquid appears in the form of a thin film between relatively movable parts of the solenoid for purposes of quelling hum, as taught more fully in my copending applications Serial No. 672,688, filed July 18, 1957, now Patent No. 2,920,254 of January 5, 1960, and Serial No. 611,543, filed September 24, 1956.

It is therefore an object of the present invention to provide an improved electromagnetically operated valve having the features indicated above.

A specific object of the present invention is to provide an improved electromagnetically operated valve structure in which means is incorporated for retarding the valve closure means in its movement from its closed position to its fully-open position, and in which means are incorporated whereby such retarding means becomes effective at different operative positions of such closure means.

Another specific object of the present invention is to provide an improved electromagnetically operated gas valve which may be adjusted to (1) open rapidly to low-fire position, (2) then move slowly toward high-fire position, and (3) close rapidly when de-energized.

Another specific object of the present invention is to provide an improved valve of this character which incorporates means accessible from the outside of the valve structure for determining the extent of rapid opening of the valve.

Another specific object of the present invention is to provide an improved valve of this type which incorporates means for effecting (1) rapid opening of the valve to low-fire position, (2) retarded further opening to medium-fire position, (3) progressively more rapid opening to fully-open position, and (4) rapid return of the valve to its closed position when the operator is de-energized.

Another specific object of the present invention is to provide an improved valve of this character in which there is an adjustment provided whereby the retarding means is effective either during the initial movement of the closure means towards its fully-open position or only after the closure means is quickly moved to a selected point in its range of movement.

Another specific object of the present invention is to provide an improved electromagnetically operated valve structure which is adjustable to establish different degrees of low-fire conditions.

Another specific object of the present invention is to provide an improved valve of this character in which there is an adjustable lost motion connection between the closure means and the retarding means.

Another specific object of the present invention is to provide an improved valve of this character in which independent power operated means are provided for returning the valve to closed position and for concurrently restoring the retarding means to its initial condition wherein it is fully operative.

Another specific object of the present invention is to provide an improved valve of this character in which return movement of the valve closure means is not impeded by the retarding means.

Another specific object of the present invention is to provide an improved valve of this character in which the retarding means comprises a viscous liquid which is contained in a common reservoir with the solenoid, and so that the liquid appears as a thin film between relatively movable parts of the solenoid to quell hum when energized with alternating current.

Another specific object of the present invention is to provide an improved valve of this character which incorporates means for retarding opening movement of the valve in the form of a dashpot device especially adapted for working in a viscous liquid.

Another specific object of the present invention is to provide an improved valve of this character in which the retarding means comprises a dashpot device incorporating valve means that does not depend on fluid pressure for its operation but is arranged so that it is operated positively to closed and to open positions.

Further objects and advantages of the invention will become apparent from the following description and accompanying drawing, and from the appended claims.

In the drawing:

Figure 2 is an elevational view of a fragment of a valve structure similar to that shown in Figure 1 but having a slightly modified dashpot arrangement and improved means for adjusting the operative position of the same;

Figure 1:
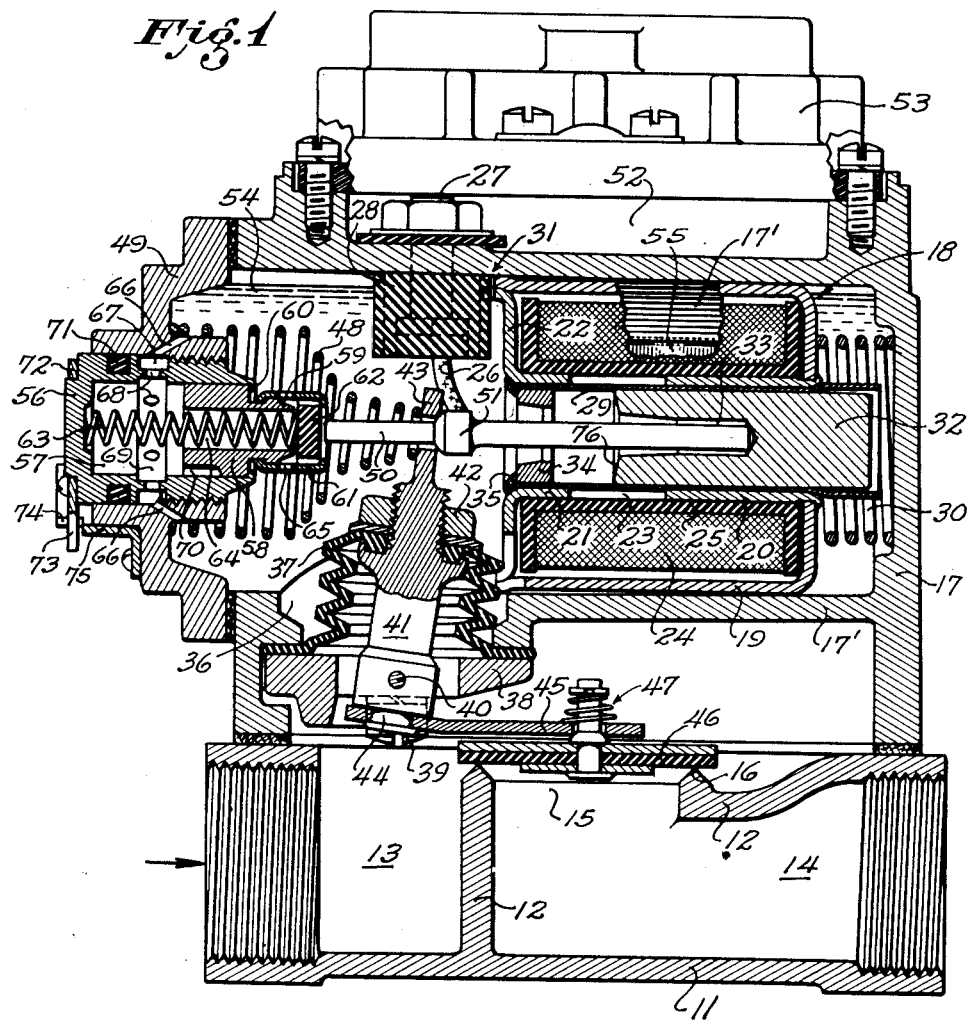
Figure 1 is a sectional view of a valve structure embodying this invention.

Figures 3 and 4 are sectional views taken, respectively, along the lines 3—3 and 4—4 of Figure 2;

Figure 5 is a fragmentary sectional view showing a modified solenoid operator and a further modified dashpot arrangement;

Figures 6 and 7 are fragmentary views, similar to that of Figure 3, showing still-further modified dashpot arrangements according to this invention; and Figure 8 is a diagram showing a solenoid operator associated with a dashpot of the negative-pressure type, as distinguished from those of the positive-pressure type shown in the other figures.

Referring now to Figure 1 of the drawing, the numeral 11 indicates a valve casing having a passage therethrough which is divided by an angled partition 12 to form an inlet chamber 13 and an outlet chamber 14, the horizontal portion of the partition having a port 15 around whose inlet end is an annular valve-seat 16.

Mounted on the valve casing, so as to enclose the open top thereof, is a hollow body 17 having at its right-hand end means, including walls 17′, forming a generally cylindrical socket for a solenoid device or electromagnet generally indicated at 18, the solenoid device and the socket being tapered conformingly and so that when the device is seated there is a space between its right-hand end and the adjacent side wall of the body.

The solenoid device 18 has a magnetic frame comprising a cup-shaped outer shell 19, a tubular member 20 inside the shell and rigidly secured at its outer end in a central opening through the end wall of the shell, and another tubular member 21 inside the shell in alignment with member 20 and having at its outer end a flange portion 22 fitting the mouth of the shell and secured thereto as by welding. The inner ends of the tubular members 20, 21 are spaced apart to provide a magnetic air-gap 23. In the annular space between shell 19 and members 20, 21 is an energizing coil 24 wound on a bobbin 25 and having leads 26 which extend through openings in the shell-flange 22 to a pair of sub-terminals 27 mounted in an insulating block 28 and projecting sealingly through openings in the top of body-portion 17′.

Fitting snugly inside the tubular frame-members 20, 21 is a cylindrical guide-tube 29, of thin nonmagnetic material, whose right-hand end portion (outside member 20) is expanded, and its left-hand extremity flared around, and soldered to, the mouth of member 21 to hold the guide tube securely in place. A spring 30, compressed between the right-hand end of the solenoid device and the adjacent side wall of the body, serves to maintain the left top edge of the device in abutment with the insulating block 28, there being a rib and notch arrangement indicated at 31 for orienting the device about its axis. Freely reciprocable inside the guide tube 29 is a cylindrical armature or magnetic plunger 32 having a deep axial recess 33, and in the mouth of the guide tube is an annular stop member 34 secured in place by a weld 35.

In the curved lower portion 17′ of the body, at its left, is an opening 36 leading to the inlet chamber 13 of the valve casing and closed by a flexible bellows 37, of material such as synthetic rubber, whose bottom flange is clamped to the body around opening 36 by an annular member 38 fastened by screws 39. Pivoted at its lower end on a pin 40 mounted in openings in member 38 is a round arm 41 whose upper portion extends through opening 36 and is provided with a collar to which the upper end of bellows 37 is sealingly clamped by a nut 42 cooperating with screwthreads on the arm. At its top, arm 41 is machined to form a flat portion 43. Secured to the bottom of arm 41, by means of a rivet portion 44 on the arm, is a generally-flat horizontal arm 45 which carries on its free end a closure member 46 cooperable with the valve seat 16; there being a floating connection 47, of conventional form, between arm 45 and the closure member.

The pivoted arm 41 and closure arm 45 are biased in clockwise direction by the force of a spring 48 compressed between a cap 49, covering a large opening through the left-hand wall of body 17, and the flat top portion 43 of arm 41; rocking of arms 41, 45 in this direction being limited by the seating of closure 46. Loosely supported at its left in an opening through the top portion of arm 41 is a rod 50 which projects through stop-ring 34 into the recess 33 of the plunger and has a rounded tip engageable with the bottom of the recess, the rod having intermediate its ends a collar 51 engageable with arm 41.

In the top of body 17 is a shallow recess 52 over which is a cover 53, of molded insulating material, for mounting of terminals (not shown) electrically connected to the sub-terminals 27. The hollow interior of body 17 is almost filled with a viscous liquid indicated at 54. The space at the right of the solenoid device 18 is in free communication with the remainder of the body interior by way of passages 55 between the body portion 17' and the solenoid device.

That part of the structure of Figure 1 so far described is substantially identical with the structure disclosed in my copending application Serial No. 611,543, filed September 24, 1956.

Threaded in an opening, coaxial with the plunger stem formed by rod 50, through a thickened central portion of cap 49 is a dashpot device comprising a cup-shaped member 56 whose interior forms a cylinder 57 for a piston 58. The right-hand portion 59 of the piston is reduced in diameter to provide a shoulder engageable by the turned-in inner end 60 of the cylinder member which limits movement of the piston toward the right. Tightly secured to the piston-portion 59 is a thin-walled tubular extension 61 containing a closure disk 62, of material such as "nylon" or synthetic rubber, whose edge is serrated to reduce friction between it and the inner surface of the extension.

A spring 63, extending through an axial opening 64 in the piston and compressed between disk 62 and the end wall of the cylinder member, maintains the disk normally in engagement with the turned-in extremity of extension 61, the disk being of such thickness that it is then spaced by a short distance from the adjacent open end of the piston which forms a valve seat for the disk. In the side wall of extension 61 are openings 65 through which the liquid 54 can pass relatively freely (by way of opening 64) to the interior of the cylinder when disk 62 is in its unseated position as shown. The cylinder is in communication with the interior of body 17 also by way of upper and lower restricted passages 66 in cap 49 registering with a circumferential groove 67 in the cylinder member, this groove having in its bottom openings 68 leading to the interior of the cylinder. So that the inner ends of openings 68 will not be obstructed by piston 58 when (as will be described) the same is moved leftward, there is a recess 69 in that part of the inner surface of the cylinder and a cooperating slot 70 in the piston. An elastic O-ring 71 in a groove around the cylinder member near its outer end prevents leakage of liquid past this member.

For limiting rotation of the cylinder member to a predetermined range of adjustment for a purpose to be described, the cylinder member carries a ring 72 having a projecting finger 73 cooperable with angularly-spaced stops (one of which is shown at 74) formed by a curved member 75 secured to cap 49. After final assembly and testing of the valve structure the ring 72 is fixed in position relative to the cylinder member as by a screw.

The parts are shown in normal position in the drawing. When current is passed through the solenoid coil 24 the plunger 32 is attracted leftward so that plunger-stem 50 engages disk 62 and moves it, against the force of spring 63, into seating engagement with the adjacent open end of the piston 58. Since the liquid can then escape from the cylinder only through the restricted openings 66, continued leftward movement of the piston is retarded. The viscosity of the preferred liquid (which will be more fully described later) is so high that the liquid does not leak past the piston. Movement of the piston is arrested when the plunger engages the stop member 34. This leftward movement of the plunger effects, through stem 50 and collar 51, counterclockwise rocking of arms 41, 45 to unseat closure 46.

The cylinder member 56 is adjusted so that there is a gap between the valve disk 62 (carried by the cylinder member) and the tip of plunger-stem 50. The connection between valve disk 62 and plunger stem 50 is referred to as a lost motion connection in that movement of the stem 50 is through an adjustable gap or space which establishes the degree of lost motion. Such gap or space in Figure 1 actually includes two spacings, namely, (1) the spacing between stem 50 and valve disk 62 and (2) the spacing between valve disk 62 and cylinder 59. This connecting between disk 62 and the stem 50 is referred to also as a one-way connection in that these elements are not interconnected in the return movement of the solenoid, i.e., the solenoid is returned to its normal de-energized position without being connected to the retarding means so that return movement of the solenoid means is not impeded by the retarding means. Because of this gap, the movement of the stem into engagement with the valve disk is rapid, as such movement of the stem is opposed virtually only by the force of the main bias spring 48. Continued movement of stem 50 through the small distance traversed before disk 62 seats, is also rapid as the only appreciable additional opposition to such movement is that afforded by spring 63. The rapid movement of stem 50, before the dashpot becomes effective to retard its movement, imparts such movement to arms 41, 45 that the main closure 46 is raised from its seat to a minimum-flow position.

The valve structure of this invention has particular utility in connection with the supply of fuel to a gas burner, and this minimum-flow position of the main closure is arranged to correspond to a predetermined low-fire condition of the burner. Because of the rapid opening of the closure to low-fire position, the possibility of backfiring in the burner (as is liable to occur if the initial supply of gas is at low rate) is prevented. The harmful effects of backfiring (deposit of carbon inside the burner, and possible fire hazard) are well known. By rotation of the cylinder 56 the gap between stem 50 and the dashpot can be varied to determine the extent of rapid opening of the closure suitable for burners of various capacities and for gases of various B.t.u. ratings and, indeed, the adjustment may be such that the stem 50 normally maintains the disk 62 against the piston 58 so that in such case there is no initial rapid movement of the plunger 50.

In the opening operation of the closure 46, immediately upon seating of the dashpot valve-disk 62 continued movement of the closure is greatly retarded by the dashpot. This prevents the possibility of "rollback" of the fire in a furnace, which may occur if gas is supplied at high rate before the furnace stack has reached the temperature necessary to produce sufficient draft. Rollback of the fire is not only productive of objectionable noise, but may cause extinguishment of the pilot burner or burners. The rate of retarded movement of the closure is determined by the viscosity of the liquid inside the dashpot and by the flow capacity of the discharge openings 66 which are usually made such that the closure does not reach its fully-open position for a time which may be as long as approximately a minute. If desired, means for adjusting the flow capacity of openings 66 may be provided.

When the solenoid device is subsequently de-energized, the main closure returns relatively quickly to its seat under the force of spring 48 (thus avoiding the possibility of backfiring in the burner) since its movement in this direction is not impeded by the dashpot, and is impeded relatively slightly by the thin film of hum quelling oil between the solenoid plunger and its guide tube. By arranging the closure means so that the closing movement of the closure is independent of the dashpot, i.e., by use of the one-way connection referred to above, the possibility of the closure being held open due to some defect in the dashpot is avoided.

The dashpot piston 58 returns promptly to normal position under the force of spring 63 which acts, immediately upon retraction of stem 50, to unseat the valve disk 62 so that the liquid can then enter the cylinder by way of openings 65 as the piston is forced toward the right by the spring acting on it through the valve disk. It will be observed that the valve disk 62 does not depend on fluid pressure for its operation, but is power-operated in one direction by the force of the solenoid and in the opposite direction by spring force. The dashpot arrangement of this invention has particular advantage over conventional forms of dashpots when a very viscous liquid is employed as the work medium.

A main purpose of the viscous liquid 54 in the valve structure is to prevent hum or vibration when the solenoid device is energized by alternating current. As is more fully described in my aforementioned applications Serial Nos. 672,688 and 611,543, when this liquid is of suitably-high viscosity and the solenoid plunger is in its attracted position in engagement with the stop member 34, A.C. vibration of the plunger is virtually eliminated because of the low pass mechanical filter construction or the so-called gluing action of the film of liquid between the cooperating surfaces of the plunger and the stop member. The term "low pass filter construction" used above is used in the same sense as in my above-mentioned applications, i.e. the fluid may be considered as being analogous to an element of a low pass mechanical filter. This analogy to a low pass filter is offered as characterizing the function of the fluid, since the results obtained clearly appear to be in accord with the definition of a low pass mechanical filter, i.e., a mechanical structure which substantially permits movement at a relatively low rate but substantially prevents or substantially attenuates movement at high rates commensurate with the frequency of the alternating current applied to the solenoid coil. The central part of the stop-engaging end of plunger 32 is undercut or dished slightly, as indicated at 76, so that only a narrow margin of the end surface of the plunger is presented to the stop ring. When the viscosity of the liquid employed is very high, the film of this liquid between the small cooperating surface areas of the plunger and stop is sufficient, by its gluing action, to prevent appreciable vibration of the plunger, but does not cause significant delay of initial movement of the plunger under the force of its bias when the solenoid is deenergized. When less viscous liquid is employed, the area of these surfaces should obviously be increased. Hum is also substantially eliminated during movement of the solenoid plunger throughout its energizing stroke which may, as indicated above, be of substantial time duration. Thus, during the entire time the solenoid is energized with A.C., the thin film of viscous liquid between the plunger 32 and its guide tube 29 prevents hum in accordance with the teachings in my above mentioned applications. It will be observed for these purposes that the ends of plunger 32 are always in communication with a large body of the liquid so that a bypass circuit for the flow of liquid exists around the ends of plunger 32. The thin film of liquid substantially eliminates hum on the theory of a gluing action or that such film comprises an element of a low pass mechanical filter.

To produce a relatively compact structure according to this invention, I have found that it is necessary to employ liquid whose viscosity is high by comparison with, for example, that of ordinary lubricating oils. While liquids such as petroleum oils may be employed, those of the silicone type are preferred because of the small change of viscosity of these liquids over a wide range of temperature, which makes it practicable to employ silicone liquids having a viscosity rating considerably higher than 1000 centistokes.

Referring now to Figures 2-4 of the drawing, the numeral 80 indicates a cap for mounting a slightly-modified dashpot structure and adapted to take the place of the cap 49 of Figure 1, the remainder of the valve structure (of which only a fragment is shown in Figure 3) being the same as in Figure 1. The dashpot parts are generally the same as those in Figure 1 and therefore have been assigned the same numerals with a prime-mark added, the main differences being (1) the piston 58' is provided with a circumferential groove 81 and connecting slots 82 which serve the same purpose as the cylinder-wall recess 69 and cooperating piston-slot 70 in Figure 1, and (2) the closure disk 62' has a central boss 83 engageable by the plunger stem 50 so that the force of the solenoid operator is applied substantially centrally of the closure disk, even if the stem 50 is somewhat out of alignment, and effects more uniform seating of the disk. The edge of disk 62' is serrated, as indicated at 84, to reduce friction.

The dashpot structure of Figures 2-4 includes improved means for limiting adjustment of the dashpot (relative to the plunger stem 50) to a range within which it is permissible to do so after the valve structure is installed on a furnace. These means comprise a pair of centrally-apertured superimposed plates 85 and 86 encircling the projecting outer end of cylinder 56' and abutting the surface of cap 80 around the cylinder end. The outer plate 85 has a bent-up portion 87 which forms a stop engageable by a radial projection or pointer 88 integral with the outer end of cylinder 56'. The inner plate 86 has a sleeve portion 89 surrounding the cylinder end and notched to receive the pointer 88 relatively closely. In the outer edge of plate 85 are notches 90 into which extend the shanks of a pair of screws 91 and 92, threaded in blind openings in cap 80, so that rotation of plate 85 is prevented when these screws are in place. The inner plate 86 is of smaller diameter so that there is clearance between its periphery and the screws 91, 92.

When the valve structure is installed on a furnace the screws 91, 92 are removed and the dashpot cylinder rotated (together with plates 85, 86) to a position in which the main valve can open initially to an extent such that the proper low-fire condition at the particular burner is effected under normal pressure of the fuel gas. With the cylinder about midway of its range of rotation relative to stop 87, the screws 91, 92 are then put in place. The screw 91 is preferably of the one-way type that cannot be removed, without special tools, after it is put in place by the furnace manufacturer. The surface of cap 80 under the head of screw 91 is raised, as indicated at 93 in Figure 4, so that when this screw is in place its head is clearanced from plate 85. The head of the other screw 92 can bear against the margin of plate 85, so that tightening of this screw effects clamping of both the plates 85 and 86 to cap 80. Since the dashpot cylinder is connected to plate 86 for rotation therewith (the cylinder pointer 88 being in a conforming notch in the sleeve portion 89 of this plate) the cylinder is locked in position when screw 92 is tightened. By loosening screw 92 the dashpot cylinder (and therewith plate 86) can be rotated in either direction to effect the final low-fire adjustment when the furnace is in service, but such adjustment is limited to the range determined by the initial setting of the then permanently-locked stop-plate 85.

In Figure 5, modified means for controlling the rates of opening and closing of a gas-supply valve are shown as applied to a solenoid operator of the "pull" type, as distinguished from one of the "thrust" type as shown in Figure 1. The solenoid operator of Figure 5 comprises an electromagnet, generally indicated at 100, of substantially the same construction as that shown in Figure 1, the only difference being that in Figure 5 the air-gap 23' is near the opposite end of the electromagnet. The parts of electromagnet 100 have therefore been assigned the same numerals as in Figure 1, but with a prime mark added, and will not be described further. Electromagnet 100 is mounted in a tapered socket formed in a body 101 which may be the same as the body 17 of Figure 1 except that it has an opening in its right end (instead of in its left end) covered by a cap 102 for mounting dashpot means.

Lining the opening through electromagnet 100, and held in place by flaring of its extremities, is a tube 103, of thin nonmagnetic material, which forms a guide for a magnetic plunger 104. It is to be assumed that this plunger is connected, as by a link 105, to a gas valve biased to closed position and openable by attraction of the plunger toward the right. An arrangement of this kind is disclosed in my Patent No. 2,712,429, now Reissue No. 24,321.

The plunger 104 carries on its right-hand end a stem 106 which projects through an opening in a stop member 107, engageable by the plunger when it is attracted, mounted in the right-hand end of tube 103 and secured thereto as by welding. This stop member is of magnetic material and is provided with a shading ring 108 which aids prevention of alternating-current hum when, as is intended, the electromagnet is energized by such current. To minimize the possibility of magnetic sticking of the plunger when the electromagnet is de-energized, the stop-engaging end of the plunger may be undercut in the same manner as is the plunger 32 of Figure 1.

Threaded in an opening, coaxial with the plunger stem 106, through the thickened central part of cap 102 is a dashpot device comprising a tubular member 109, closed at its outer end by a screw-plug 110, whose interior forms a cylinder 111 for a piston 112. This piston has an axial opening 113 therethrough and is reduced in diameter at its left end to form an annular valve-seat 114 around this opening. The piston 112 is biased leftward by the force of a compression spring 115 so that the valve seat 114 is normally in sealing engagement with a rubber-like closure disk 116 carried by the plunger stem and preferably molded thereon. In the wall of cylinder member 109 is a plurality of radial openings 117 and communicating horizontal openings 118 leading to the space 119 between the dashpot device and the solenoid operator, which space contains viscous liquid indicated at 120.

When the electromagnetic operator is energized, the initial movement of the plunger, and accordant initial movement of the dashpot piston 112, is rapid since the liquid can escape relatively freely from cylinder 111 through the openings 117, 118. The cylinder member 109 is adjusted so that when its openings 117 are just covered by the end of the piston the main valve closure has reached a position wherein the rate of flow of gas past it is sufficient to establish a low-fire condition at the particular burner supplied. After openings 117 are covered by the piston, its further movement is retarded since the liquid can then escape from the cylinder only by way of a pair of suitably restricted passages 121 interconnecting the reservoir or space 119 and a circumferential groove 122 in the cylinder member, which groove is in communication with the interior of the cylinder member by way of radial openings 123. So that these openings will not be obstructed by the piston when it reaches its innermost position, the inner surface of the cylinder member at and beyond openings 123 is recessed as indicated at 124. An elastic O-ring 125 ensures against leakage past the outer end of cylinder member 109. When the solenoid operator is subsequently de-energized the plunger returns promptly, under the force of the bias of the gas valve to which it is connected, to its normal position determined by the seating of the closure of that valve. Since the closure disk 116 is carried by the plunger stem, the dashpot piston follows closely behind the plunger under the force of spring 115.

The modified dashpot arrangements of Figures 6 and 7 are adapted to cooperate with a solenoid valve-operator of the same construction as that shown in Figure 1; each of the dashpot devices of Figures 6, 7 being adjustably mounted in a threaded opening through a thickened central part of a cap 80 substantially the same as that shown in Figure 3.

In Figure 6, the dashpot comprises a cup-shaped member 130 whose interior forms a cylinder 131 for a piston 132; the right-hand end of the piston being reduced in diameter to provide a shoulder 133 engageable with the turned-in end 134 of the cylinder member and normally in engagement therewith under the force of a compression spring 135, the piston having a deep axial recess so that this spring may be long and of low rate.

The cylinder 131 is continuously in communication with the interior of body 17, and the viscous liquid 54 therein, only by way of upper and lower restricted passages 136 in cap 80 leading to a circumferential groove 137 in the cylinder member, this groove having in its bottom a plurality of openings 138 leading into the cylinder. In the inner surface of the cylinder member, longitudinally thereof, is one relatively long slot 139 extending from the end wall of the cylinder member to a point near its right-hand end, and three similar but shorter slots 140 (one not seen) which terminate in a plane spaced leftward from the right end of slot 139. Means, including plates 141 and 142, are provided for limiting adjustment of the cylinder member 130 and for locking it in position. These means are identical with the means, including corresponding plates 85 and 86, for that purpose shown in Figures 2-4 and will not be described further.

Upon energiaztion of the solenoid operator the plunger-stem 50 of Figure 6 moves freely, through a distance determined by the setting of cylinder member 130, into engagement with the end wall 143 of piston 132; the main valve then being in its predetermined partly-open or low-fire position. Farther movement of the plunger stem, and opening of the main valve, is retarded since the viscous liquid can escape, initially, from cylinder 131 only by way of the restricted passages 136 as piston 132 is forced inwardly.

The retarded movement of the parts continues until the shoulder 133 of the piston reaches the right-hand end of the long slot 139 in the cylinder member, at which point the main valve is open wide enough that fire of medium size is produced at the gas burner. When the piston passes this point the liquid can escape from the cylinder through slot 139 and around the small-diameter end of the piston so that movement of the parts is at higher rate, but not so fast that there is any possibility of rollback of the fire. When the piston shoulder reaches and passes the ends of the other slots 140, farther movement of the parts (until the solenoid plunger reaches its stopped position and the piston is near the left end of the cylinder) is at relatively high rate since the liquid can then escape from the cylinder through all of the slots 139, 140. The gas valve is then fully open. When the solenoid operator is subsequently deenergized the plunger and plunger stem return promptly to their normal positions and the gas valve closes. Return of the dashpot piston, under the force of spring 135, to the point at which flow through slots 140 is obstructed by the larger-diameter portion of the piston is relatively rapid, the piston then moving at slower rate until flow through slot 139 also is obstructed, and at still slower rate until it reaches its stopped position, as the liquid can enter the cylinder only through passages 136 during the final return movement of the piston. An obvious advantage of the simplified dashpot arrangement of Figure 6 is the fact that no valve means is required for its operation.

The cylinder 130 may be adjusted so that there is no air-gap or spacing between plunger stem 50 and piston 143, in which case there is no initial quick opening of the gas valve.

The dashpot in Figure 7 comprises a tubular member 150 having four relatively wide slots 151 lengthwise of its cylindrical inner surfaces. The left-hand end of member 150 is permanently closed (after slots 151 are broached) by a plug 152. The right-hand end of the member is recessed to receive a ring 153, of bearing material such as brass, whose internal diameter is the same as that of the member, the ring being held in place by the turned-in extremity 154 of the member, with a washer 155 between these parts.

Reciprocable in the cylinder 156 formed by the interior of member 150 is a piston 157 whose right-hand end is reduced in diameter to provide a shoulder 157' engageable with the washer 155. The piston is hollow and has an end wall 158 through which is a restricted opening 159 and another (central) opening 160 whose flow capacity may be about four times that of opening 159. The cylinder is normally in communication with the viscous liquid 54 by way of both of these openings. The inner surface of the piston at its left is preferably tapered, as indicated at 161, to facilitate removal of any air bubbles that might accidentally be introduced. The piston is normally maintained in engagement with the stop-washer 155 by the force of a compression spring 162 inside the cylinder. Means, identical with those shown in Figures 2 and 6, and including plates 163 and 164 corresponding to plates 85 and 86 in Figure 2, are provided for locking the cylinder member 150 in adjusted position.

The solenoid plunger-stem 50' of Figure 7 differs significantly from that shown in Figures 1, 3 and 6 only in that it carries a closure disk 165 seatable on the surface of the end wall of the piston around opening 160. The face of this closure disk is convex on a radius equal to the length of the plunger stem so that it seats relatively accurately regardless of such misalignment of the parts that may occur in production. As shown in Figure 7, the upper portion 43' of the pivoted arm 41 is bifurcated to receive the plunger stem, a cotter pin 166 being provided to prevent displacement of the stem.

When the solenoid operator associated with the dashpot structure of Figure 7 is energized, the plunger stem 50' moves relatively freely through the space or gap separating the closure disk 165 and piston 157, thereby bringing the gas valve promptly to its low-fire position. Inasmuch as the opening 160 is then closed by disk 165, fluid can escape from the dashpot cylinder only through the small opening 159 as the piston is moved inwardly under the force of the solenoid operator, so that the initial movement of the piston and farther opening of the gas valve are greatly retarded. The opening 160 is made relatively small to minimize possible leakage through it when the closure disk 165 is seated.

The ring 153 in the outer end of the cylinder has a V-notch 167, communicating with one of the cylinder-slots 151, through which the fluid can escape (around the small-diameter end of the piston) when the shoulder 157' of the piston enters it, so that the rate of movement of the parts increases progressively. However, relatively rapid movement of the parts does not occur until the piston shoulder passes the inner edge of ring 153, whereupon the fluid can escape from the cylinder through all of the four slots 151. It is to be understood that when the piston shoulder 157' reaches the inner edge of ring 153 the gas valve will have opened (slowly) wide enough that rollback of the fire cannot occur subsequently.

Upon subsequent de-energization of the solenoid operator the plunger and plunger stem return promptly to their biased positions and the gas valve closes. Return of the dashpot piston, under the force of spring 162, to the point at which flow through slots 151 is obstructed by the larger-diameter portion of the piston is relatively rapid, the piston then moving at slower rate as the fluid escapes through notch 167 and openings 159, 160, and at slightly slower rate after notch 167 is obstructed. It will be observed that in the arrangement of Figure 7 the final part of return movement of the dashpot piston is more rapid than in the arrangement of Figure 6 because of flow through opening 160, which flow is permitted immediately upon retraction of the plunger stem and closure disk 165 carried thereby.

By providing such large bypass passage ways around the dashpot piston, three results ensue, namely, (1) the gas valve is opened quickly toward the end of its stroke and after the effective retarding period is over, (2) the return of the dashpot piston is expedited so that it will be in a position to prevent a subsequent too rapid opening of the gas valve in case the solenoid is energized a short time after it is deenergized, and (3) heating in the solenoid coil is reduced since the solenoid plunger reaches its final position sooner where it causes the minimum current to flow in the coil.

Here again, in Figure 7, the adjustment may be made so that normally the plunger 50' closes the piston opening 160, in which case there is no initial quick opening of the gas valve.

The solenoid operator shown diagrammatically in Figure 8 differs essentially from those of the other figures only in that it is arranged so that liquid is drawn into a dashpot cylinder (instead of being expelled therefrom) to effect the retarded movement of the plunger.

In Figure 8, the numeral 180 indicates a dashpot cylinder member adjustably mounted in a threaded opening through a wall 181 which corresponds to an outer wall of the liquid-filled housing 17 shown in the other figures. Inside the cylinder member is a tubular piston 182 which is biased in leftward direction by the force of a spring 183 compressed between it and a centrally-apertured plate 184 secured to the right-hand end of the cylinder member, a shoulder 185 in this member determining the biased position of the piston.

Shown at the right in Figure 8 is a solenoid operator comprising a plunger 186 which is biased leftward into engagement with a stop 187 by the force of a spring 188 compressed between the plunger and a wall 189, the plunger being attractable toward the right upon passage of current through a cooperating solenoid 190. The plunger has a stem 191 extending through the tubular piston 182 and carrying a closure disk 192 engageable with the left end of the piston to close the opening therethrough. The cylinder member 180 is adjusted in its support so that when the plunger and the piston are in their stopped positions there is a gap 193, of predetermined dimension, between closure disk 192 and the adjacent end of the piston.

It is to be understood that the solenoid plunger 186 may be operatively connected to a normally-closed gas valve and arranged so that when the plunger is attracted the valve is opened rapidly to its low-fire position when the closure disk 192 is moved (through gap 193) into seating engagement with piston 182. Farther movement of the plunger toward the right and opening of the gas valve are at low rate since the accompanying movement of the piston effects enlargement of the dashpot cylinder 194 and the liquid from inside the housing can now enter this cylinder only through a restricted opening 195 in the cylinder member.

When the parts reach a position wherein the gas valve is in a medium-fire position, a slot 196 in the inner wall of the cylinder member is uncovered by the piston so that the liquid can then enter the cylinder through this slot, final movement of the parts therefore being relatively rapid. Upon subsequent de-energization of the solenoid operator the plunger and gas valve return rapidly to biased position, the dashpot piston following their movement as the liquid escapes from the cylinder through the hollow of the piston.

The arrangement of Figure 8, while operative for the purpose of this invention, has certain disadvantages over the arrangements shown in the other figures: (1) any air bubble accidentally introduced into the dashpot cylinder would become enlarged under the negative pressure so that the retarding effect would be reduced to a greater degree than if the bubble were under positive pressure, also there is the possibility of gassing of the liquid under some conditions, and (2) the gas-valve operating means cannot be entirely separated from the dashpot so that the possibility of mechanical failure is increased, and assembly of the structure is more difficult.

The cylinder 180 may be adjusted so that there is no gap 193 and in such case there is no initial quick opening of the gas valve which is considered to be actuated by the solenoid plunger 186.

The specific embodiments of my invention herein shown and described are obviously susceptible of modification without departing from the spirit of the invention, and I intend therefore that no limitation be placed on the invention except as defined by the scope of the appended claims.

I claim as my invention:

1. In a solenoid operated valve, said valve having closure means movable between closed and fully open positions; solenoid means directly connected to said closure means for movement of the same between said closed and open positions, said solenoid means including: a movable part; retarding means operated by said part for retarding said movement of said closure means to fully open position when said solenoid means is energized; a one-way connection between said part and said retarding means, there being a lost motion space provided between said part and said retarding means when said solenoid means is unenergized; and means for adjusting said space between said part and said retarding means.

2. In a solenoid operated valve, said valve having closure means movable between closed and fully-open positions: solenoid means directly connected to said closure means for movement of the same between said closed and open positions, said solenoid means having an energized position and a deenergized position; retarding means for retarding movement of said closure means when said solenoid means is energized; a one-way connection between said solenoid means and said retarding means; means for returning said solenoid means to its de-energized condition; and independent means for restoring said retarding means to its normal condition, when said solenoid is de-energized, in a short time commensurate with the time required for return of said solenoid means to its de-energized condition.

3. In a solenoid operated valve, said valve having movable closure means: solenoid means directly connected to said closure means for movement of the same; means for retarding movement of said closure means when said solenoid means is energized, said retarding means comprising: a cylinder; a piston movable in said cylinder, said piston having a through opening; a part operated by said solenoid means for closing said opening so as to retard movement of said piston and said closure means; means for returning said solenoid means to a de-energized condition and for simultaneously opening said opening; and independent means for moving said piston.

4. In a solenoid valve for controlling supply of fuel gas to a burner: a valve casing having a passage therethrough; closure means in said casing for controlling flow through said passage and having resilient means biasing said closure means to closed position; a solenoid operator mounted on the outside of said casing and comprising a reciprocable plunger having an operating stem; means, extending sealingly through an opening in the casing, forming a direct connection between said stem and said valve means for moving said valve means to open position when said solenoid operator is energized; means forming a housing around the solenoid operator; viscous liquid in said housing; and dashpot means, mounted in said housing and exposed to said liquid, for retarding movement of said closure means toward fully-open position, said dashpot means being spaced a distance apart from said plunger stem to provide a lost motion connection therebetween when said closure means is in its closed position, said dashpot means being engageable with said plunger stem and being effective only when the stem has moved through said distance sufficient to effect partial opening of the closure means.

5. A solenoid valve according to claim 4 wherein said dashpot means comprises means forming a hollow cylinder; piston means in said cylinder; and means defining a restricted opening fluidly connecting the interior of the cylinder with the viscous liquid in said housing; said piston means being operable, by movement of said plunger stem, to cause said liquid to flow through said restricted opening and thereby effect said retarded movement of the closure means.

6. A solenoid valve according to claim 5, wherein said dashpot means has said piston means coaxial with said plunger stem and engageable thereby.

7. A solenoid valve according to claim 4, wherein said dashpot means comprises means forming a hollow cylinder; piston means in said cylinder; and means defining a restricted opening and a relatively large opening, each normally connecting the interior of the cylinder with the viscous liquid in said housing; said piston means being coaxial with said plunger stem and engageable thereby; said plunger stem effecting, when the solenoid operator is energized, closing of said relatively-large opening and movement of the piston means such as to cause said liquid to flow through said restricted opening and thereby effect said retarded movement of the closure means.

8. A solenoid valve according to claim 4, wherein said dashpot means comprises means forming a hollow cylinder; a piston in said cylinder; means defining a restricted opening fluidly connecting the interior of the cylinder with the viscous liquid in said housing; said piston being operable, by movement of said plunger stem, to cause said liquid to flow through said restricted opening so that movement of the piston and said closure means is then retarded; and means defining a relatively large opening for establishing communication between the cylinder and the housing, said relatively large opening being obstructed by the piston during said retarded movement of the parts but being unobstructed upon continued movement of said parts so that the liquid can flow through it during said continued movement of the parts and permit relatively-rapid final movement of the closure means to fully-open position.

9. A solenoid valve according to claim 4, wherein said dashpot means comprises means forming a hollow cylinder; a piston in said cylinder; means defining a restricted opening and a first relatively-large opening, each normally connecting the interior of the cylinder with the viscous liquid in said housing; said piston being coaxial with said plunger stem and engageable thereby; said plunger stem effecting, when the solenoid operator is energized, closing of said first relatively-large opening and movement of the piston such as to cause said liquid to flow through said restricted opening so that movement of the piston and said closure means is then retarded; and means defining a second relatively-large opening for establishing communication between the cylinder and the housing, said second relatively-large opening being obstructed by the piston during said retarded movement of the parts but being unobstructed upon continued movement of said parts so that the liquid can flow through it during such continued movement of the parts and permit relatively-rapid final movement of the closure means to fully-open position.

10. A solenoid valve according to claim 9, wherein said first relatively-large opening is an axial opening through said piston.

11. A solenoid valve according to claim 10, including means carried by said plunger stem for closing said first relatively-large opening.

12. In an A.C. solenoid valve for controlling supply of fuel gas to a burner: a valve casing having a passage therethrough; closure means in said casing for controlling flow through said passage and biased to closed position; an A.C. solenoid operator mounted on the outside of said casing and comprising a reciprocable plunger having an operating stem; means for guiding said plunger; means, extending sealingly through an opening in the casing, forming a direct connection between said stem and said valve means for moving said valve means to open position when the solenoid operator is energized; means forming a housing around the solenoid operator; viscous liquid in said housing and extending between said plunger and its guide for quelling A.C. hum; the clearance space between said guide and said plunger and the viscosity of said liquid therebetween being such as to allow movement of said plunger relative to said guide at a relatively slow rate but to prevent relative movement therebetween at a high rate which is commensurate with the frequency of the alternating current; and liquid dashpot means, cooperating with said plunger stem, for retarding movement of said closure means toward fully-open position, said dashpot means being mounted in said housing and exposed to said liquid.

13. In an A.C. solenoid operated valve, said valve having closure means: solenoid means directly connected to said means for movement of the same; a chamber containing viscous liquid; retarding means including said liquid and engageable by said solenoid means for retarding movement of said closure means; said retarding means being spaced a distance away from said solenoid means to provide a lost motion connection therebetween when said closure means is in its closed position; said solenoid means including two relatively telescoping members with a film of said liquid therebetween for quelling hum when said solenoid means is energized with alternating current the clearance space between said telescoping members and the viscosity of said film of liquid therebetween being such as to allow relative movement between said members at a relatively slow rate but to prevent relative movement therebetween at a high rate which is commensurate with the frequency of said alternating current.

14. In an A.C. solenoid operated valve, said valve having closure means: solenoid means directly connected to said means for movement of the same; a fluid chamber containing fluid; said solenoid means comprising: a magnetic structure; an armature attracted by said magnetic structure, a portion of said liquid being disposed in a clearance space between said armature and magnetic structure; said clearance space between said armature and said magnetic structure and the viscosity of said liquid in said clearance space being such as to allow relative movement of said armature with respect to said magnetic structure at a relatively slow rate but to prevent relative movement between said magnetic structure and said armature at a high rate which is commensurate with the frequency of the alternating current applied to said solenoid means for quelling A.C. hum; retarding means including a portion of said liquid; a part of said solenoid means being engageable with said retarding means for operating said retarding means and said retarding means being spaced a distance apart from said solenoid means part to provide a lost motion connection between said part and said retarding means when said closure means is in its closed position.

15. A valve as set forth in claim 14, in which the connection between said part and said retarding means comprises a one-way connection.

References Cited in the file of this patent

UNITED STATES PATENTS

| | | |
|---|---|---|
| 956,789 | Allan | May 3, 1910 |
| 1,166,699 | Lutz | Jan. 4, 1916 |
| 1,730,688 | Rippl | Oct. 8, 1929 |
| 1,944,841 | Kimball | Jan. 3, 1934 |
| 2,088,174 | Paullin | July 27, 1937 |
| 2,111,960 | Begerow | Mar. 22, 1938 |
| 2,145,977 | Foster | Feb. 7, 1939 |
| 2,151,534 | Scofield | Mar. 21, 1939 |
| 2,159,405 | Schubert | May 23, 1939 |
| 2,348,383 | Hedgecock | May 9, 1944 |
| 2,357,959 | Kouyoumjian | Sept. 12, 1944 |
| 2,417,096 | Thriy | Mar. 11, 1947 |
| 2,622,622 | Ray | Dec. 23, 1952 |
| 2,700,397 | Compton | Jan. 25, 1955 |
| 2,710,021 | Jones | June 7, 1955 |
| 2,752,453 | Wallace | June 26, 1956 |
| 2,759,698 | Jorgensen | Aug. 21, 1956 |
| 2,761,424 | Hopkins | Sept. 4, 1956 |